United States Patent
De Antoni Migliorati et al.

(10) Patent No.: US 7,325,578 B2
(45) Date of Patent: Feb. 5, 2008

(54) CONTAINER FILLING MACHINE

(75) Inventors: Narciso De Antoni Migliorati, Castiglione Delle Stiviere (IT); Stefano Cavallari, Bologna (IT)

(73) Assignee: Azionaria Construzioni Macchine Automatiche A.C.M.A. S.p.A., Bologna (IT)

( * ) Notice: Subject to any disclaimer, the term of this patent is extended or adjusted under 35 U.S.C. 154(b) by 519 days.

(21) Appl. No.: 10/297,713

(22) PCT Filed: Feb. 28, 2002

(86) PCT No.: PCT/IT02/00120

§ 371 (c)(1),
(2), (4) Date: Sep. 4, 2003

(87) PCT Pub. No.: WO02/068312

PCT Pub. Date: Sep. 6, 2002

(65) Prior Publication Data

US 2004/0025962 A1 Feb. 12, 2004

(Under 37 CFR 1.47)

(30) Foreign Application Priority Data

Feb. 28, 2001 (IT) .................................... BO2001A0109

(51) Int. Cl.
*B65B 1/04* (2006.01)

(52) U.S. Cl. .................................... 141/83; 141/144
(58) Field of Classification Search .................... 141/83, 141/129, 144–152
See application file for complete search history.

(56) References Cited

U.S. PATENT DOCUMENTS

| 4,582,102 | A | | 4/1986 | Risser |
| 5,148,841 | A | * | 9/1992 | Graffin ........................ 141/83 |
| 5,700,982 | A | | 12/1997 | Neuman |
| 6,644,363 | B2 | * | 11/2003 | Sogliani et al. ............... 141/83 |

FOREIGN PATENT DOCUMENTS

EP          0790183 A1    8/1997

* cited by examiner

*Primary Examiner*—Steven O. Douglas
(74) *Attorney, Agent, or Firm*—Harness, Dickey & Pierce, P.L.C.

(57) ABSTRACT

A machine for filling containers with liquid or particulate material, wherein a carousel conveyor, rotating continuously about an axis, supports a number of supporting and weighing heads, each of which is independent of the other supporting and weighing heads and supports a respective container beneath a respective feed device for supplying the fill material; and wherein each supporting and weighing head is connected structurally and functionally to the carousel conveyor by a respective fast-fit connecting/disconnecting device.

10 Claims, 2 Drawing Sheets

CONTAINER FILLING MACHINE

TECHNICAL FIELD

The present invention relates to a machine for filling containers with liquid or particulate material.

BACKGROUND ART

For this purpose, filling machines are used comprising a carousel conveyor rotating continuously about an axis; a number of feed devices for supplying the fill material, and which are carried by the conveyor, arranged about the rotation axis of the conveyor, and located at respective loading stations; and a supporting and weighing unit carried by the conveyor to support a number of empty containers, each located at a respective loading station to receive the fill material from a respective feed device.

In known machines of the above type (e.g. as disclosed in U.S. Pat. No. 4,582,102), the supporting and weighing unit comprises a cylindrical tank and an annular ring plate, which is placed under the tank, is coaxial to the tank and supports weighing heads, each of which is designed to weigh a respective container and is directly placed on an upper surface of the annular ring plate. In known machines of the above type, the supporting and weighing unit is therefore an integrated unit, so that any servicing and/or repairs and/or replacements and/or cleaning carried out at any one of the loading stations call for stopping the machine throughout. In this regard, it is worth noting that the interspace between the weighing heads and the upper surface of the annular ring plate is particularly difficult to properly clean.

DISCLOSURE OF THE INVENTION

It is an object of the present invention to provide a container filling machine designed to eliminate the aforementioned drawbacks of the known state of the art.

According to the present invention, there is provided a machine for filling containers as recited by claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
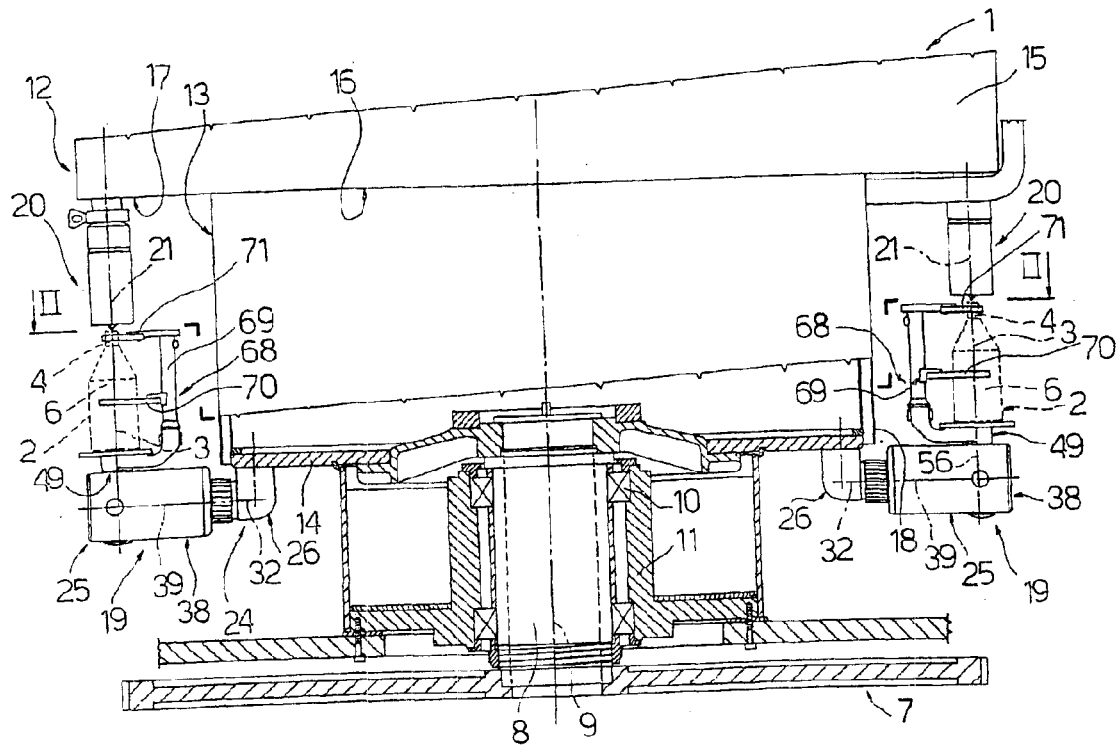
FIG. 1 shows a partly sectioned side view of a preferred embodiment of the machine according to the present invention.
Figure 2:
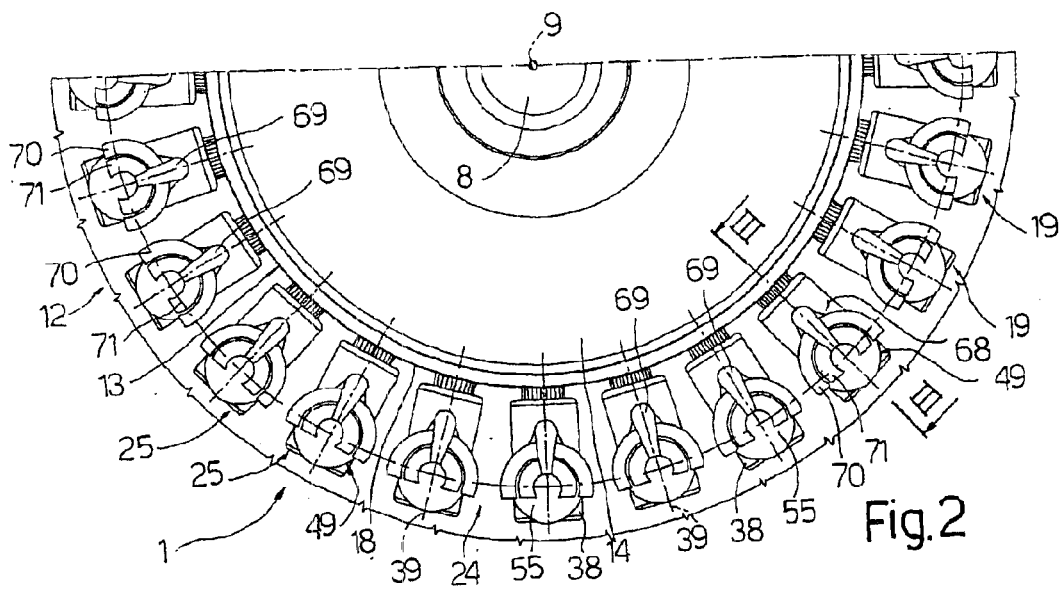
FIG. 2 shows a half-section along line II—II in FIG. 1.

With reference to the accompanying drawings, number 1 indicates as a whole a machine for filling containers, which, in the example shown, are defined by substantially cylindrical bottles 2, each positioned with its axis 3 substantially upright, and comprising, at the top, a neck 4 having, at the top end, an inlet/outlet opening 5 for a material 6, which may be particulate or, as in the example shown, liquid.

Machine 1 comprises a fixed base 7, a central portion of which is defined by a cylindrical column 8 having a substantially vertical axis 9 and supporting for rotation, with the interposition of bearings 10, a tubular base stem 11 of a carousel conveyor 12 fitted to base 7 and rotated continuously about axis 9 by a known drive motor not shown.

Conveyor 12 comprises a cylindrical base body 13 coaxial with axis 9 and defined at the bottom by a bottom wall 14 connected integrally to a top end of stem 11; and a cylindrical tank 15 also coaxial with axis 9 and supported on top of and by cylindrical body 13. Tank 15 is larger in diameter than cylindrical body 13, and is defined at the bottom by a bottom wall 16 substantially perpendicular to axis 9 and comprising a peripheral portion 17 which projects outwards of an outer cylindrical wall 18 of cylindrical body 13.

Conveyor 12 also comprises a number of loading stations 19 equally spaced about axis 9 and defined by respective known feed devices 20 for supplying material 6, and which extend downwards from peripheral portion 17 of wall 16 of tank 15 along respective axes 21 parallel to axis 9, and are controlled in known manner by respective valve devices 22 and by respective known flow sensors 23; and a supporting unit 24 for receiving bottles 2 and supporting each at a respective loading station 19, outwards of wall 18, beneath peripheral portion 17 of wall 16, and with respective axis 3 coaxial with axis 21 of a relative feed device 20.

Supporting unit 24 comprises, for each loading station 19, a respective supporting and weighing head 25 connected removably to cylindrical body 13 with the interposition of a fast-fit structural and functional connecting/disconnecting device defined by a bracket 26 integral with cylindrical body 13.

Figure 3:
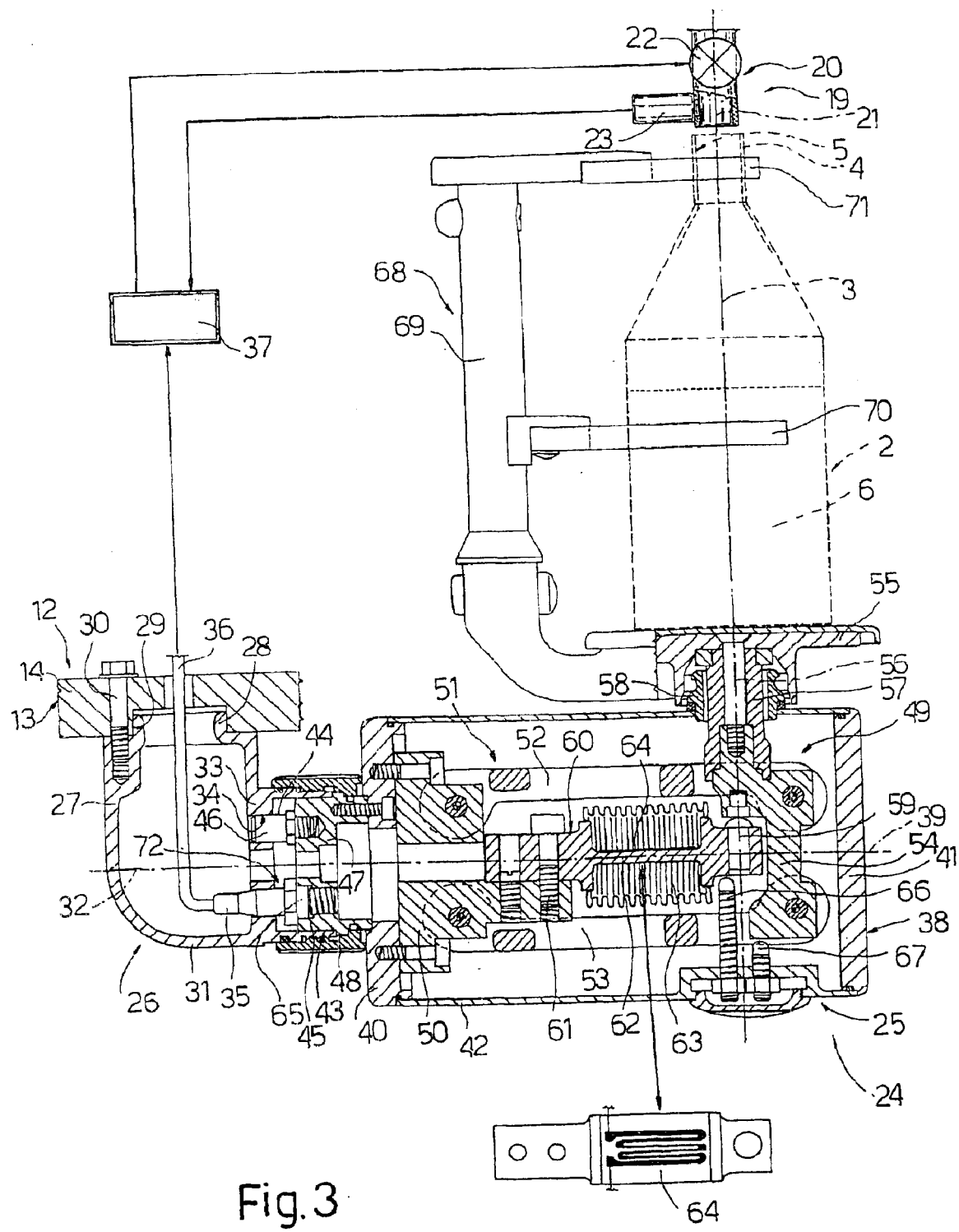
FIG. 3 shows a larger-scale section along line III—III in FIG. 2.

As shown more clearly in FIG. 3, each bracket 26 is substantially L-shaped, extends radially with respect to axis 9, and comprises a tubular arm 27, which extends downwards and parallel to axis 9 from bottom wall 14 of cylindrical body 13, has a tubular end appendix 28 engaging a seat 29 formed in wall 14, and is connected integrally to wall 14 by screws 30. Bracket 26 also comprises a further, cylindrical, tubular arm 31, which extends outwards and along a radial axis 32 from the bottom end of tubular arm 27, is threaded externally, and is separated from tubular arm 27 by a partition 33 crosswise to axis 32. Partition 33 has a through hole 34 eccentric with respect to axis 32, and is fitted through with an electric socket 35 connected, by a cable 36 extending along tubular arm 27 and through wall 14, to a processing unit 37 in turn connected to valve devices 22 and sensors 23.

Each head 25 comprises a substantially cylindrical casing 38 having a longitudinal axis 39, and in turn comprising two end walls 40 and 41—wall 40 facing the free end of relative arm 31—and a cylindrical lateral wall 42 coaxial with axis 39. Each head 25 is connected to relative arm 31 by two setting devices 43 and 44. Device 43 is a transverse setting device defined by a tubular appendix 45, which extends outwards from wall 40, coaxially with axis 39, and fits precisely by a given length inside the open free end of relative arm 31, so that axis 39 is coaxial with relative axis 32. Device 44 is an angular setting device defined by an eccentric pin 46, which is carried by a transverse partition 47 closing appendix 45, and engages relative hole 34 by a length shorter than the length of appendix 45 fitted inside relative tubular arm 31. An internally threaded ring nut 48 is fitted in axially sliding and angularly idle manner to the outer surface of appendix 45, and engages the external thread of relative tubular arm 31 to bring the free end of relative tubular arm 31 into contact with an outer shoulder rib carried by appendix 45.

Casing 38 houses a scale 49 comprising a block 50 for connection to the inner surface of wall 40, and defining the frame of an articulated parallelogram 51, which forms part of scale 49 and in turn comprises two cranks 52 and 53 located one over the other in a substantially radial plane with respect to axis 9, and extending from block 50 in a direction substantially perpendicular to axis 9, and a connecting rod 54 substantially parallel to axis 9. Scale 49 also comprises a plate 55, which has an axis 56 substantially parallel to axis 9, is located outside casing 38, and is connected integrally to the top end of an upright 57, which is integral, at the bottom, with a point along crank 52 close to connecting rod 54, is coaxial with axis 56, and engages in sliding manner a sleeve 58 coaxial with axis 56 and fitted radially through lateral wall 42.

Articulated parallelogram 51 is supported in the position described above by a pin 59 cooperating with crank 52 and fitted, coaxially with axis 56, to the free end of a bracket 60, which is connected integrally to block 50 by screws 61, is located between cranks 52 and 53, is substantially parallel to cranks 52 and 53, and has a thin, relatively flexible intermediate portion 62 protected by a bellows sleeve 63 and supporting a printed circuit 64, which defines a load cell connected electrically to relative socket 35 by a plug 65 fitted through partition 47 and connected to printed circuit 64 in known manner not shown.

Two stop pins 66 and 67, parallel to and on opposite sides of axis 56, are fitted through lateral wall 42 of casing 38, diametrically opposite sleeve 58, to cooperate laterally with bracket 60 and crank 53 when bracket 60 is flexed by a static load applied to plate 55 in a direction parallel to axis 56.

A gripping assembly 68 is connected integrally to plate 55 to hold a relative bottle 2 erect on plate 55, with its axis 3 coaxial with axis 56, and comprises an upright 69 extending upwards from and alongside plate 55, and supporting two forks 70 and 71 for engaging the body and neck 4 of bottle 2 respectively.

In actual use, conveyor 12 is rotated continuously about axis 9, and, at each turn, each loading station 19 receives a relative bottle 2, which is unloaded when filled.

With reference to one loading station 19, an empty bottle 2, when loaded on to plate 55 of relative head 25 and engaged by relative gripping assembly 68, exerts its weight on relative bracket 60, which, on deforming, sends signals, via printed circuit 64, to processing unit 37, which determines in known manner the weight (tare) of the empty bottle 2. Once this is done, processing unit 37 opens valve device 22 of relative feed device 20 to gradually fill bottle 2, the gradual increase in weight of which is detected continuously by relative scale 49. In the event the flow of material 6 through relative feed device 20, as detected by relative sensor 23, does not correspond to a continuous increase in weight (thus indicating a damaged or broken bottle 2), processing unit 37 closes valve device 22. Under normal circumstances, processing unit 37 closes valve device 22 when the detected weight, minus the tare measured previously, reaches a given preset value, which is obviously reached before bottle 2 reaches a station (not shown) where it is unloaded in known manner off supporting unit 24.

In connection with machine 1 described above, it should be pointed out that forming supporting unit 24 by means of a number of separate heads 25—which can be selectively assembled/disassembled extremely easily by virtue of relative setting devices 43 and 44, relative ring nuts 48, and relative fast-fit electric connections 72, each defined by a relative socket 35 and relative plug 65—provides, not only for greatly simplifying any repair work or servicing as compared with corresponding known filling machines, but also for carrying out such work without stopping filling machine 1 for longer than strictly necessary to disconnect and reconnect the individual heads 25.

What is claimed is:

1. A machine for filling containers with liquid or particulate material, the machine comprising a carousel conveyor rotating continuously about an axis; a tank, which is part of the carousel conveyor and is coaxial with the axis; a number of feed devices for supplying said material, which are connected to said tank, are carried by said carousel conveyor, are arranged about said axis, and are located at respective loading stations; and supporting and weighing means carried by said carousel conveyor to support and weigh a number of said containers, each located at a respective said loading station to receive said material from a respective said feed device; said supporting and weighing means comprising a number of independent supporting and weighing heads, each of which, is designed to support and weigh a respective said container at a respective said loading station; and said carousel conveyor comprising a cylindrical body, which is coaxial with the axis, is placed under said tank is defined at the bottom by a bottom wall; the machine being characterized in that each supporting and weighing heads is connected removably to the cylindrical body so as to radically overhang from the cylindrical body; and being provided a number of fast-fit connecting/disconnecting means, each located at a respective loading station to permit fast structural and functional connection/disconnection of a respective supporting and weighing head to/from said cylindrical body.

2. A machine as claimed in claim 1, wherein each supporting and weighing head is connected removeably to the bottom wall of the cylindrical body by means of a respective fast-fit connecting/disconnecting means.

3. A machine as claimed in claim 1, wherein each of said fast-fit connecting/disconnecting means comprises a respective bracket, which overhangs in planes radial to said axis from said'. bottom wall of the cylindrical body.

4. A machine as claimed in claim 3, and comprising screws, which connect integrally each bracket to the bottom wall.

5. A machine as claimed in claim 3, wherein each bracket is substantially L-shaped and comprises a tubular arm, which extends downwards and parallel to said axis, and an arm, which extends along a radial axis of the carousel conveyor and is connected to a relative supporting and weighing head.

6. A machine as claimed in claim 1, wherein each said supporting and weighing head comprises a scale, which has a plate for supporting a respective said container and emits an electric signal proportional to the weight of the respective said container; transmission means being provided to connect said scale to a processing and control unit; said transmission means comprising a cable extending along the relative connecting means; and said scale being connected to said cable by means of a fast-fit socket-plug connection comprising two face-fit terminals, of which a first terminal is carried by said connecting means, and a second terminal is carried by said supporting and weighing head.

7. A machine as claimed in claim 1 wherein each said connecting means comprises an end member having a longitudinal axis and defining, with the relative said supporting and weighing head, an assembly comprising a first setting device for setting an assembly position of said supporting and weighing head crosswise to said longitudinal axis, a second setting device for setting an angular assembly position of said supporting and weighing head about said longitudinal axis, and releasable locking means for preventing relative displacement of said supporting and weighing head with respect to said end member in a direction parallel to said longitudinal axis.

8. A machine as claimed in claim 7, wherein said end member is a tubular member coaxial with said longitudinal axis; each said supporting and weighing head comprising a projecting cylindrical member, which engages said end member in rotary and axially sliding manner to define, with the end member; said first setting device.

9. A machine as claimed in claim 8, wherein said second setting device comprises a mechanical pin-socket coupling defined by a face pin carried by one of said two members and parallel to and eccentric with respect to said longitudinal axis, and by a face seat for receiving said pin and formed on the other of said two members.

10. A machine as claimed in claim 7, wherein said end member is a tubular member coaxial with said longitudinal axis and having, an external thread; and each said supporting and weighing head comprises a projecting cylindrical member internally engaging said end member in axially and angularly sliding manner; said releasable locking means comprising a ring nut fitted in axially sliding and angularly idle manner to said cylindrical member and engaging said external thread.

* * * * *

UNITED STATES PATENT AND TRADEMARK OFFICE
CERTIFICATE OF CORRECTION

| | | |
|---|---|---|
| PATENT NO. | : 7,325,578 B2 | Page 1 of 1 |
| APPLICATION NO. | : 10/297713 | |
| DATED | : February 5, 2008 | |
| INVENTOR(S) | : Narciso De Antoni Migliorati et al. | |

It is certified that error appears in the above-identified patent and that said Letters Patent is hereby corrected as shown below:

Title Page, Item (73)   Assignee:   Should Read

Azionaria Costruzioni Macchine Automatiche A.C.M.A. S.p.A.

Signed and Sealed this

Twenty-sixth Day of August, 2008

JON W. DUDAS
*Director of the United States Patent and Trademark Office*